US009450832B2

(12) United States Patent
Drooghaag et al.

(10) Patent No.: US 9,450,832 B2
(45) Date of Patent: Sep. 20, 2016

(54) DEVICE AND METHOD FOR IMPROVING HOME NETWORK INFRASTRUCTURE

(75) Inventors: Benoit Drooghaag, Ophain-Bois-Seigneur-Isaac (BE); Haris Gacanin, Antwerpen (BE)

(73) Assignee: Alcatel Lucent, Boulogne-Billancourt (FR)

( * ) Notice: Subject to any disclaimer, the term of this patent is extended or adjusted under 35 U.S.C. 154(b) by 390 days.

(21) Appl. No.: 13/977,998

(22) PCT Filed: Jan. 24, 2012

(86) PCT No.: PCT/EP2012/051002
§ 371 (c)(1),
(2), (4) Date: Jul. 2, 2013

(87) PCT Pub. No.: WO2012/104165
PCT Pub. Date: Aug. 9, 2012

(65) Prior Publication Data
US 2013/0290507 A1    Oct. 31, 2013

(30) Foreign Application Priority Data
Jan. 31, 2011    (EP) .................................... 11305095

(51) Int. Cl.
| G06F 15/16 | (2006.01) |
| H04L 12/24 | (2006.01) |
| H04L 12/26 | (2006.01) |

(52) U.S. Cl.
CPC ............... *H04L 41/14* (2013.01); *H04L 41/22* (2013.01); *H04L 43/0811* (2013.01)

(58) Field of Classification Search
CPC ............... H04L 41/22; H04L 12/2803; H04L 12/2809; H04L 41/0803; H04L 43/10; H04L 12/2628; H04L 12/282; H04L 12/2823; H04L 12/2827; H04L 12/2836
See application file for complete search history.

(56) References Cited

U.S. PATENT DOCUMENTS

| 6,577,934 B2 | 6/2003 | Matsunaga et al. |
| 6,735,619 B1 | 5/2004 | Sawada |

(Continued)

FOREIGN PATENT DOCUMENTS

| CN | 101133632 A | 2/2008 |
| EP | 1936875 A1 | 6/2008 |

(Continued)

OTHER PUBLICATIONS

Office Action for corresponding European Application No. 11 305 095.9 dated Jul. 16, 2014.

(Continued)

*Primary Examiner* — Brian J Gillis
*Assistant Examiner* — Shean Tokuta
(74) *Attorney, Agent, or Firm* — Harness, Dickey & Pierce, P.L.C.

(57) ABSTRACT

A home network physical layer analysis platform includes a collection engine adapted for receiving information indicative for stability and performance of an existing home network physical layer configuration from one or more home network devices. Each of the network devices are connected in the home network by a respective network technology. An analysis engine is adapted for analyzing the information to identify whether substantial network connectivity problems exist in the home network, and for associating the information with a problem out of a set of predetermined problems, if connectivity problems exist. The platform also includes a communication means for communicating the problem to a user interface, such that the respective user is informed about the problem.

14 Claims, 4 Drawing Sheets

(56) References Cited

U.S. PATENT DOCUMENTS

| | | | |
|---|---|---|---|
| 8,214,494 B1* | 7/2012 | Slavin | 709/224 |
| 2002/0116103 A1 | 8/2002 | Matsunaga et al. | |
| 2004/0049714 A1 | 3/2004 | Marples et al. | |
| 2005/0114496 A1* | 5/2005 | Fang et al. | 709/224 |
| 2006/0098725 A1 | 5/2006 | Rhee et al. | |
| 2008/0080411 A1* | 4/2008 | Cole | 370/328 |
| 2009/0034424 A1* | 2/2009 | Chen | H04L 41/06 370/245 |
| 2009/0316707 A1 | 12/2009 | Hawley et al. | |
| 2011/0129071 A1* | 6/2011 | Blackburn et al. | 379/1.04 |
| 2011/0137772 A1* | 6/2011 | Davis et al. | 705/34 |
| 2012/0026908 A1* | 2/2012 | Tzannes | H04L 41/12 370/252 |
| 2014/0012945 A1* | 1/2014 | Barnhill et al. | 709/217 |

FOREIGN PATENT DOCUMENTS

| | | | |
|---|---|---|---|
| JP | H03289735 A | 12/1991 | |
| JP | 2001053779 A | 2/2001 | |
| JP | 03289740 B2 | 6/2002 | |
| JP | 2002243591 A | 8/2002 | |
| JP | 2003234800 A | 8/2003 | |
| JP | 2003309662 A | 10/2003 | |
| JP | 2004336235 A | 11/2004 | |
| JP | 2005032192 A | 2/2005 | |
| JP | 2009193177 A | 8/2009 | |
| JP | 2010068075 A | 3/2010 | |

OTHER PUBLICATIONS

Office Action for corresponding Japanese Application No. 2013-550852 dated Jul. 4, 2014 and English translation thereof.

Ndo G. et al.: "An Adaptive Procedure for Impulsive Noise Mitigation over Power Line Channels", Global Telecommunications Conference, 2009. GLOBECOM 2009. IEEE, IEEE, Piscataway, NJ, USA, Nov. 30, 2009, pp. 1-6, XP031645709.

Yang C. et al.: "Method and System of Performance Monitoring to Detect VDSL Service Degradation", Cyber-Enabled Distributed Computing and Knowledge Discovery (CYBERC), 2010 International Conference on, IEEE, Piscataway, NJ, USA, Oct. 10, 2010, pp. 468-475, XP031786429.

International Search Report PCT/ISA/210 for PCT/EP2012/051002 dated Jun. 3, 2012.

* cited by examiner

DEVICE AND METHOD FOR IMPROVING HOME NETWORK INFRASTRUCTURE

This application is the national phase under 35 U.S.C. §371 of PCT International Application No. PCT/EP2012/051002 which has an International filing date of Jan. 24, 2012, which designated the European Patent Office and which claims priority to European patent application number 11305095.9 filed Jan. 31, 2011; the entire contents of each of which are hereby incorporated by reference.

TECHNICAL FIELD

The present invention relates to the field of methods and devices for improving the quality (stability and performance) of home network infrastructure.

BACKGROUND

Residential internet connectivity traditionally consists of single voice-band modem, a Digital Subscriber Line or DSL modem, or a coax-cable modem, connected to a computer in the house. With the arrival of new applications and technologies, such as digital television, on-line gaming and home automation, the Internet access needs to be extended to various types of home devices, such as a set-top box, a game console, a home automation system, plural desktops or laptops, etc. All those home devices are then typically interconnected by means of a home network, which need to be set up and configured. A home network typically accesses the Internet via a home network gateway or residential gateway, which is connected to an access network via a traditional DSL modem or coax-cable modem.

The interconnectivity between two devices is typically based on, typically already existing, in-house media such as twisted pair phone wires, electrical power wires and/or coax-cables. Also, wireless technologies like WiFi may be used in a home network.

Most of the time, the in-house available media typically suffers from a low quality physical layer offering poor immunity for interference in-house. Twisted pair phone wires are usually slightly twisted. Electrical power wires typically consist of low category cable that is not twisted at all. As a result, these existing media are usually very sensitive to various kinds of noise. This is also the case at least to a certain extent for most of the existing in-house networking technologies.

The communication links between two in-house devices may be impacted to such an extent that the usable bandwidth between the two nodes is drastically reduced, such that the intended service cannot be provided.

If a communication problem occurs between two different home networking devices, it is in practice left to the end user to diagnose the problem and to solve it usually without any assistance. Only a few advices may be given via the operator helpdesk, but the responsibility of the operator is usually limited to the access network only, and any problem occurring in a home network area is responsibility of the end user.

SUMMARY

An objective of the present invention is to disclose a home network physical layer diagnosis platform and method that will overcome at least one of the above mentioned problems. More particularly, it is an objective to disclose such a platform and method that enables the user to improve the quality of in-house data links between two devices.

This is achieved by the characterizing features of claim 1.

According to a first aspect of the present invention a home network physical layer analysis platform is disclosed comprising a collection engine adapted for receiving information indicative for stability and performance (or quality) of an existing home network physical layer configuration from one or more home network devices, each of the network devices being connected in the home network by means of respective network technology; an analysis engine, adapted for analyzing the information to identify whether substantial network connectivity problems exist in the home network, and for associating the information with a problem out of a set of predetermined problems, if this is the case; a communication means for communicating the problem (or problem information) to a user interface, such that the respective user is informed about the problem.

According to preferred embodiments of the present invention a home network physical layer analysis platform is disclosed, wherein the analysis engine is adapted for identifying whether substantial network connectivity problems exist in the home network by comparing the information with reference information accessible by the platform.

The reference information can be, completely or at least in part, network technology dependent.

According to preferred embodiments of the present invention a home network physical layer analysis platform is disclosed, wherein the analysis engine is adapted for associating the information with a problem out of a set of predetermined problems by comparing the information with a predetermined set of criteria, the criteria being associated with the set of predetermined problems.

According to preferred embodiments of the present invention a home network physical layer analysis platform is disclosed, further comprising a solution instruction engine adapted for retrieving solution information for the problem, and wherein the communication means is adapted for communicating the solution information together with the problem to the user interface.

According to preferred embodiments of the present invention a home network physical layer analysis platform is disclosed, wherein information indicative for stability and performance of an existing home network physical layer comprises noise information.

According to preferred embodiments of the present invention a home network physical layer analysis platform is disclosed, wherein information indicative for stability and performance of an existing home network physical layer comprises at least one of channel frequency response information, channel asymmetry information or information relating to channel non-linearity or transceiver non-linearity.

According to preferred embodiments of the present invention a home network physical layer analysis platform is disclosed, wherein the collection engine, the analysis engine, and the communication engine are controlled to iteratively receive information indicative for stability and performance of an existing home network physical layer configuration from one or more home network devices, to analyze the information, determine a possible problem, and communicate the problem, optionally with solution information, to a user interface.

According to preferred embodiments of the present invention a home network physical layer analysis platform is disclosed, wherein the home network comprises a home network gateway and wherein the home network physical layer analysis platform is integrated in the home network gateway.

According to preferred embodiments of the present invention the home network physical layer analysis platform is being integrated in a remote server which is connected to the home network over the internet.

According to preferred embodiments of the present invention the home network physical layer analysis platform is being integrated in at least one home network device.

According to preferred embodiments of the present invention the home network physical layer analysis platform is being adapted for use in a G.hn home network.

According to preferred embodiments of the present invention a home network physical layer analysis platform is disclosed, wherein the user interface is located at a remote server which is connected to the home network over the internet.

According to preferred embodiments of the present invention a home network physical layer analysis platform is disclosed, wherein the user interface is located at a home network gateway of the home network.

According to preferred embodiments of the present invention a home network physical layer analysis platform is disclosed, wherein the user interface is integrated in at least one home network device.

According to a second aspect of the present invention a method is disclosed for improving a home network physical layer, comprising; receiving information indicative for stability and performance of an existing home network physical layer configuration from one or more home network devices, each of the network devices being connected in the home network by means of respective network technology; analyzing the information to identify whether substantial network connectivity problems exist in the home network, and for associating the information with a problem out of a set of predetermined problems, if this is the case; communicating the problem to a user interface, such that the respective user is informed about the problem.

According to preferred embodiments of the present invention, the method comprises identifying whether substantial network connectivity problems exist in the home network by comparing the information with reference information accessible by the platform.

According to preferred embodiments of the present invention, the method comprises associating the information with a problem out of a set of predetermined problems by comparing the information with a predetermined set of criteria, the criteria being associated with the set of predetermined problems.

According to preferred embodiments of the present invention the method further comprises retrieving solution information for the problem, and communicating the solution information together with the problem to the user interface. The solution information comprises information which allows the user associated with the user interface to solve an existing connectivity problem in the home network.

According to preferred embodiments of the present invention a method is disclosed wherein information indicative for stability and performance of an existing home network physical layer comprises noise information.

According to preferred embodiments of the present invention a method is disclosed, wherein information indicative for stability and performance of an existing home network physical layer comprises at least one of channel frequency response information, channel asymmetry information or information relating to channel non-linearity or transceiver non-linearity.

According to preferred embodiments of the present invention a method is disclosed, wherein the collection engine, the analysis engine, and the communication engine are controlled to iteratively receive information indicative for stability and performance of an existing home network physical layer configuration from one or more home network devices, to analyze the information, determine a possible problem, and communicate the problem with the solution information to a user interface.

According to preferred embodiments of the present invention a method is disclosed, wherein analyzing is performed in a home network gateway.

According to preferred embodiments of the present invention a method is disclosed, wherein analyzing is performed in a remote server which is connected to a home network over the internet.

According to preferred embodiments of the present invention a method is disclosed, wherein analyzing is performed in at least one home network device.

According to preferred embodiments of the present invention a method is disclosed, used for a home network which is a G.hn home network.

According to preferred embodiments of the present invention a method is disclosed, wherein the communication occurs to a user interface located at a remote server which is connected to the home network over the internet.

According to preferred embodiments of the present invention a method is disclosed, wherein the communication occurs to a user interface located at a home network gateway of a home network.

According to preferred embodiments of the present invention a method is disclosed, wherein the communication occurs to a user interface located at a one home network device.

According to a third aspect of the present invention a computer program is disclosed comprising computer program code means adapted to perform all the steps of claims 12 to 25 when the program is run on a computer.

Further aspects of the present invention are described by the dependent claims. The features from the dependent claims, features of any of the independent claims and any features of other dependent claims may be combined as considered appropriate to the person of ordinary skill, and not only in the particular combinations as defined by the claims.

BRIEF DESCRIPTION OF THE DRAWINGS

The accompanying drawings are used to illustrate embodiments of the present invention.

Reference signs are chosen such that they are the same for similar or equal elements or features in different figures or drawings.

DESCRIPTION OF ILLUSTRATIVE EMBODIMENTS

The description of aspects of the present invention is performed by means of particular embodiments and with reference to certain drawings but the invention is not limited thereto. Depicted figures are only schematic and should not be considered as limiting.

In the description of certain embodiments according to the present invention, various features are sometimes grouped together in a single embodiment, figure, or description thereof for the purpose of aiding in the understanding of one or more of the various inventive aspects. This is not to be interpreted as if all features of the group are necessarily present to solve a particular problem. Inventive aspects may lie in less than all features of such a group of features present in the description of a particular embodiment.

A main aspect of the present disclosure is to develop a generic diagnosis engine for the home network, providing to the end customer information about the problems impacting the performances of its home network and recommendations on how to solve those problems.

This invention is particularly valuable with the upcoming technologies like G.hn. offering a common interface for home networks running on different media.

The G.hn or ITU-T 9660 Recommendation is a standard specification for wired home networks that covers twisted pair phone lines, electrical power wires and coax cables as possible media for in-house data transmission.

Figure 1:
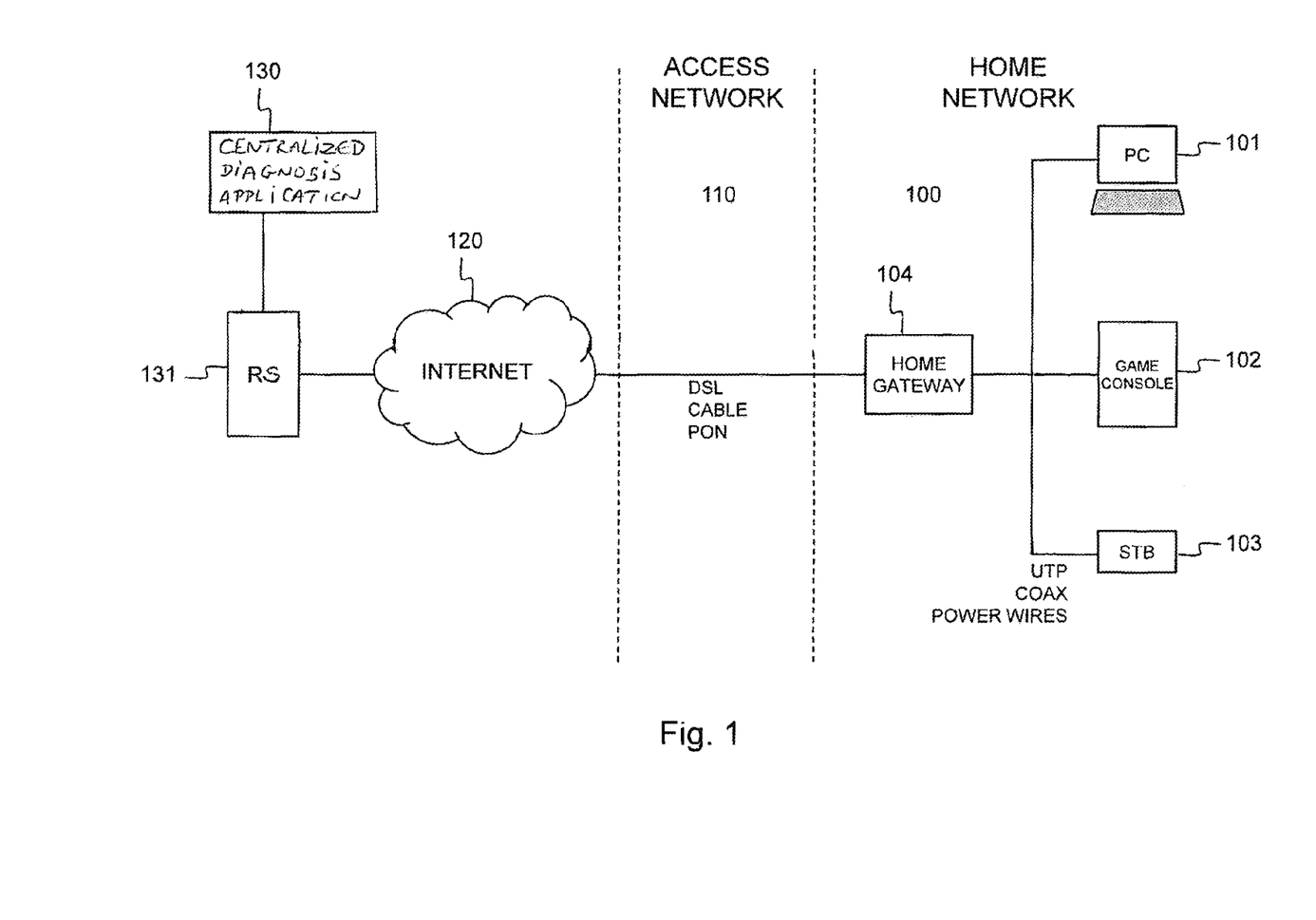
FIG. 1 illustrates a typical diagram showing the different network domains (internet/access network/home network), wherein a home network physical layer analysis platform is embodied as a software application on a remote server.

FIG. 1 shows a home network 100 with a computer 101, game console 102 and digital television set-top box 103 connected to the Internet 120 via a residential gateway 104 and access network 110. The home devices 101, 102 and 103 are supposed to be ITU-T G.hn compliant. FIG. 1 further shows an analysis platform according to the present invention, i.e. an analysis application 130 running on a remote server to analyse parameter values of the home network's physical layer. The results of the analysis are associated with a database listing possible problems and which are associated with respective instruction information for an user in the home. Then the information is provided to the user, or to any other location where this information may be useful.

Different types of problems can for instance be diagnosed: abnormal noise, abnormal channel frequency response, channel asymmetry, channel or transceivers non-linearity.

Abnormal Noise:

With the exception of coaxial cable, which is very well protected against external noise source due to the cable shield, all the potential media used for the home networking (phone lines, power lines, wireless) show a very high susceptibility to pick up radiated noise from all kind of house hold appliances (well-known noise sources are i.e. neon and economic light, dc/dc converters, motors from vacuum cleaners and washing machines, . . . ). The in-house appliances can generate also a significant level of impulse noise that may degrade the transmission performance in terms of Bit Error Rate (BER) and throughput.

It is very valuable to know for the end-customer whether an abnormal noise level is affecting his home network, as corrective actions are often possible. Corrective actions can be for instance moving the home network device away from the noise source, or installing a noise filter between the noise source and the home network device.

Depending on the home networking technology, often the noise level can be measured directly by the home network device. For instance, typically wireless devices as for instance WiFi devices report the noise level for each frequency channels in which they are authorized to emit.

For other technologies, like HPNA, Moca, HomePlug, that usually comply to a standard like TR-098, the noise level can be derived from the standardized parameters. These parameters can for instance comprise Signal-to-Noise Ratio (SNR), and Channel Frequency Response (CFR). The following relationship can be used:

Noise Level [dBm/Hz]=*TxPSD* [dBm/Hz]+CFR [dB]−SNR [dB];

where TxPSD is the transmitted signal PSD, which is a known parameter, and which is different for each home networking technology standard.

Impulse noise can be monitored by means of for instance error counters (BER counter) or retransmission counters for the technologies for which an automatic retransmission mechanism is foreseen.

Different levels of analysis (can also be called diagnosis) are possible:

Determining whether the noise level is normal or not, or in other words, detecting that the home network is impacting by an abnormal noise disturber or not. This can be done by comparing the measured noise level to an expected noise level, derived from standard, for instance EMC regulations or from experience.

Identifying the disturber type (neon light, dc/dc converter, motor . . . ). This is very valuable for the end-customer as it will facilitate the identification of the disturber and therefore help the customer to take corrective actions. This can be achieved by comparing the measured noise level to a database of well-known disturbers "signatures" (typical noise emission spectrum specific to each particular disturber type).

Figure 2:
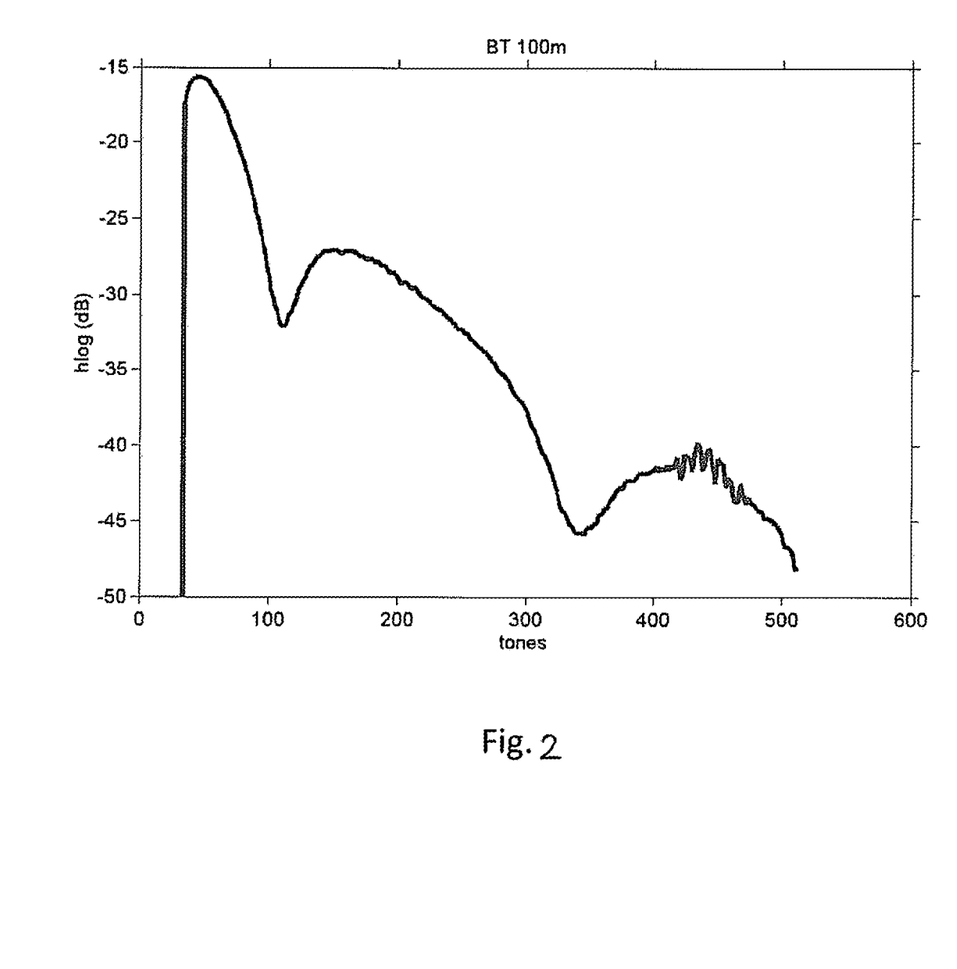
FIG. 2 illustrates the effect of a 100 m bridge tap on the channel frequency response of a longer loop.

Abnormal Channel Frequency Response:

Many home networking technologies, at least all the ones compliant to technical report TR-098, report the channel frequency response as a standardized parameter. This corresponds to the channel attenuation (or insertion loss) as function of the frequency, in the bandwidth range that is allowed for that technology. The expected values are dependent on the specific medium, but in many cases, the expected values (or value ranges) are known due to conformity with a standard, mathematical simulation models or experience. A deviation with regard to those expected values can be detected and conclusions can be derived on the presence of channel impairment. Those impairments are also specific to each medium or home network technology. Some examples of known types of impairment that can be detected in the channel frequency response are the following, for different type of network technology:

Phone Wires:

Phone wires models exist, especially in the case of DSL communication. It is known that the attenuation in function of frequency should follow a 1/sqrt(f) curve for a straight loop. A typical deviation to this law is very often a consequence of a "bridged-tap" (being an additional wire segment connected to the main loop). This can be detected in the channel frequency response detecting regularly-spaced dips in the curve, as illustrated on FIG. 2.

Coax Cable:

Coaxial cable technology usually exhibits very low losses, which makes the channel frequency response quite flat. Nevertheless, it is very often the case when the channel is not made of a single straight cable, but is made of several branches interconnected via passive power splitters. If all the branches are not properly terminated by matched impedance, reflections will occur and the same phenomena as the "bridge-tap" affecting phone lines will happen. This will result in a similar "signature" in the channel frequency response (regularly-spaced dips) that can be detected.

Another type of impairment can be caused by too many passive power splitters being used in cascade. As those splitters are usually low-cost resistive splitters, each of them introduces an extra attenuation. If too many splitters are used in cascade, the attenuations will sum up and can become too high and not compatible anymore with the bitrates needed to offer the target service.

Power Lines:

Power line networks are, by design, made of many branches. Therefore, "bridge-tap" effects as described above occur all the time and can be seen as inherent impairment of the network. Other factors are also known to impair the power line channel. Especially all kinds of capacitive devices that may be connected to the power line are known to act as a short circuit at high frequencies used by home networking communications. Those capacitive devices may be found for instance in the EMI filter of many house hold appliances (so-called X2 capacitor). Very common lightning protection devices made of Metal-Oxide Varistor (MOV) also exhibit a capacitive behavior that impairs the power line communication channel.

Figure 3:
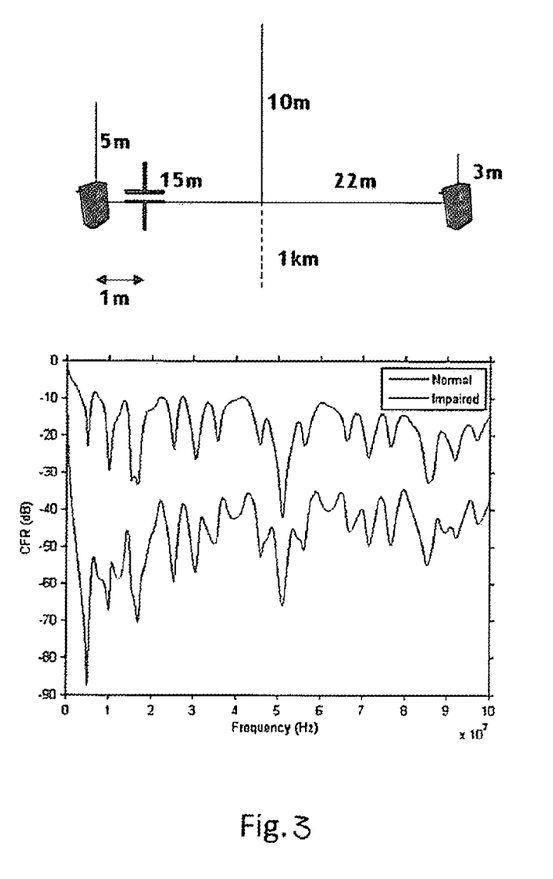
FIG. 3 illustrates the impact of a capacitive device on the power line channel frequency response, in the graph. The drawing above the graph illustrates the topology of the capacitive device. The capacitive device is characterised by a capacitor of 100 nF having a self-resonant frequency of 5 Mhz and a quality factor of 10.

This effect is illustrated on FIG. 3. As one can see, the channel frequency shows a lot of variation because of the "bridge-tap" effect due to the branches present in the network topology. This effect is already responsible for a 10 to 20 dB of average signal attenuation. When the capacitive device is inserted, the curve is even more shifted down, resulting is a much higher attenuation.

Figure 4:
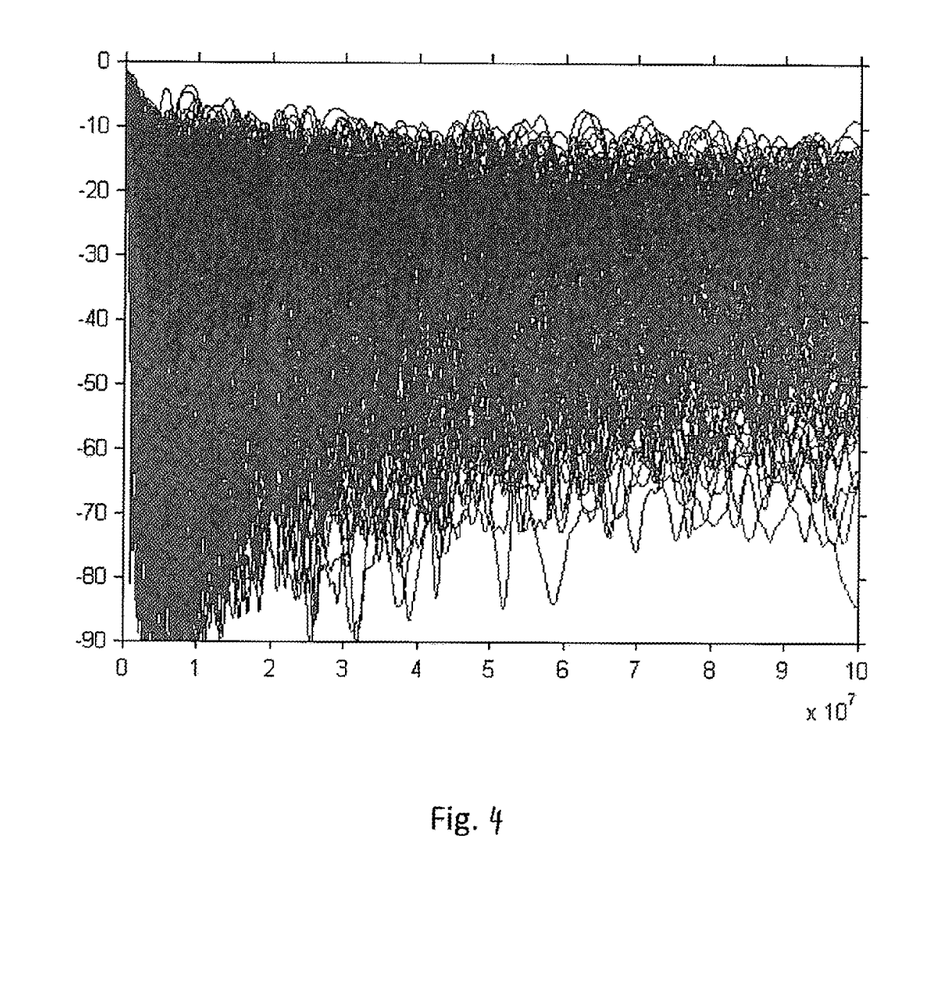
FIG. 4 illustrates the results of a Monte-Carlo simulation of channel frequency response (dB) versus frequency (Hz) of various power lines networks. The upper, black curves are non-impaired cases, the lower, dark grey curves are the same cases as the upper curves but impaired by a capacitive devices (Monte-Carlo simulation ranges: between 3 and 20 branches in the home network topology, each branch between 5 m and 30 m, impairment located anywhere on the first branch, capacitor between 10 and 100 nF, with self-resonant frequency between 1 and 10 MHz and quality factor between 1 and 100.)

The results of a Monte Carlo simulation (resulting of many cases generated randomly within some boundaries) are shown on FIG. 4. This shows that, independently of the home network topology, when the power line channel is impacted, the average attenuation is always higher than without the presence of a capacitive impairment (the lower dark grey curves are always below the upper black curves in average). This proves that it is statistically possible to determine the presence of the capacitive impairment from the channel frequency response level. This element can be used to diagnose an abnormal, impaired, power line channel. For example, the simulation results tend to prove that if the attenuation at 10 MHz is higher than 50 dB, the probability to have an impaired case is very high.

Wireless:

In-house wireless propagation environments are composed of a large number of multipaths. This is due to the reflections of the transmitted signals. As for the "bridged-tap" effect for wired communications, this multipath environment will cause the rise of the channel frequency-selectivity which is illustrated in FIG. 3. This is expected to be the major impairment for wireless communication systems.

Channel Asymmetry:

As long as the propagation medium is made of passive and reciprocal material elements (like wires), the channel frequency response (or insertion loss) from a node A to a node B should be the same as the insertion loss from node B to node A (provided that both nodes have the same impedance).

A typical example where this is not the case is a coaxial cable network, where an unidirectional CATV amplifier has been inserted between the two nodes. Because of that unidirectional amplifier, there can be a strong attenuation difference between the two directions, up to the point that the bitrates needed to offer the target service is not reachable anymore. Tracking the difference between the channel frequency responses measured between the two same nodes but in opposite directions can be done to diagnose such kind of problem.

For wireless networks, an asymmetry in communications performances can be found if a node acts as a communication relay between two other nodes, located in different areas, and if a disturber impacts specifically one of these areas. In that case, the throughput from node A to B will be different from the throughput from node B to A. When this asymmetry is detected, it can be used to diagnose the presence of a disturber specific to a given location.

Channel or Transceivers Non-Linearity:

Most home networking technologies are based on multi-carriers, Orthogonal-Frequency-Division-Multiplexing (OFDM) techniques. It is well-known that every transmission technique based on an OFDM is very sensitive to channel non-linearity. Indeed, non-linearity of the channel induces intermodulation distortion (a signal emitted on a given frequency 'leaks' to other frequencies, impacting neighboring carriers), which has a strong impact on the transmission performance.

A well-known example of this phenomenon in the DSL domain is the interference with Plain Old Telephony System (POTS) equipment (phones, faxes, . . . ). This type of equipment usually exhibits non-linear impedance in the DSL frequency band.

When connected to a twisted pair carrying DSL signal, this non-linear impedance induces intermodulation distortion of the DSL signal which results in a severe degradation of the performance. So-called 'DSL splitter' or 'in-line filters' have to be installed on those equipments to isolate them from the DSL signals.

The same problem will impact home networking technologies such as HomePNA or G.hn running over phone wires.

Note that non-linearity may be the consequence of broken or poor quality transceivers, and therefore impact not only phone wires but any other medium.

The diagnosis of such kind of problems may be achieved by various ways, some of which are explained below:

the interference due to non-linearity increases with the transmitted signal power. It can be detected by the fact that an increase of the transmitted signal power by x dB does not result in an increase of SNR by x dB (that should be the case for a purely linear system). Therefore, non-linearity can be detected by comparing 2 SNR measurements performed with 2 different transmitted signal powers.

Other tests, specific to OFDM, may also be performed, like the MTPR (Multi-Tone Power Ratio) that is often used to characterize the end-to-end system linearity.

The analysis platform can be located at different locations in the network. Similarly, the associated method can be performed at different locations. The communication of respective information is possible towards different locations in the network. Although preferred, the location of the analysis platform does not have to correspond to the location of the user interface. Below, some preferred embodiments are described.

Analysis Platform Inside Each Home Networking Node:

An analysis platform can be implemented directly in the home networking nodes. Once established, communications to the user interface of the problem information and possibly solution information can be performed in different ways.

According to preferred embodiments, the respective information is displayed on the home network node itself. For instance, power line adapters with an LCD screen are already available on the market today. Such a screen could be used to display analysis information. The main advantage of that solution is that the end customer, associated with the user interface, immediately sees the analysis result (problem information, optionally solution information). If this analysis reports a bad link quality, due to channel impairment or abnormal noise, the adapter can be moved to another position (e.g. in another wall plug in the case of a power line adapter) to see of the link quality is improved.

According to other embodiments, a node's web management interface could be used. Even if the home network nodes act as a bridge at layer 2 (according to ISO model), a web server accessible via a dedicated IP address is usually embedded in each home networking node, at least for management purpose. Various analysis information (problem information and optionally solution information) could be provided via that web server as well.

Implementing the analysis engine directly in the home networking nodes allows analysis which is based on the correlation of parameters measured by all the nodes connected on the same physical medium, as a common physical medium is usually seen as a broadcast domain where all nodes connected to it can communicate with each other.

Analysis Platform Inside the Home Gateway:

As illustrated on FIG. 4, the home gateway is actually acting as a gateway between the access network and the home network. This home gateway can communicate with all the home network nodes, whatever the network technology (wired or wireless). A web server is always implemented in that gateway for management purpose. This server can be used to provide analysis information (problem information and optionally solution information) to the end-customers.

Implementing the analysis engine in the home gateway provides the additional advantage that the analysis can be based on the correlation of parameters measured by all the home network nodes of the house, for all the home networking technologies used in that house, and not only limited to a given medium (given physical layer technology).

Analysis Platform Inside a Remote Application:

Because all the parameters needed for analysis are usually accessible remotely (typically via SNMP or TR-069 protocols), the analysis engine can be implemented in a remote server, accessing the parameters measured by the home network nodes via the internet. A web server can be implemented in that remote application, where the service provider and the end-customers can log in to access the analysis information (problem information and optionally solution information).

Implementing the analysis in a remote application allows some analysis based on the correlation of the parameters between all the customers monitored by the remote application (typically all the customers of the service provider).

It should be noted that according to embodiments of the present invention, different locations where the analysis engine can be implemented are described. Also different options exist as to where the problem information, and optionally solution information, is communicated to the user. These locations do not necessarily have to correspond. The present invention can for instance be implemented in such a way that the analysis platform is implemented (and thus performed) in a remote application, whereby the analysis result (problem information, optionally solution information) is forwarded to the home gateway or directly to the home networking nodes to be displayed to the end customer by means of an associated user interface as for instance a display.

While some embodiments described herein include some but not other features included in other embodiments, combinations of features of different embodiments are meant to be within the scope of the invention, and form different embodiments, as would be understood by the skilled person.

The invention claimed is:

1. A home network analysis platform comprising:
a memory having computer readable instructions stored therein; and
a processor configured to execute the computer-readable instructions to, receive information corresponding to a stability and a performance of a home network physical layer configuration of a home network from one or more home network devices, the home network physical layer configuration including twisted pair phone lines, electrical power wires or coaxial cables for in house data transmission, each of the one or more home network devices configured to be connected to the home network via a respective network technology;
analyze said information to identify whether network connectivity problems associated with the home network physical layer configuration exists, the network connectivity problems including channel frequency response information, channel asymmetry information, channel non-linearity information and transceiver non-linearity information;
associate at least one identified network connectivity problem with a problem from a set of problems; and
communicate said problem to a user via a user interface to inform the user about said problem.

2. The home network analysis platform according to claim 1, wherein said processor is configured to analyze whether the one or more network connectivity problems exist in the home network by comparing said information with reference information accessible by said home network analysis platform.

3. The home network analysis platform according to claim 1, wherein said processor is configured to associate said information with a problem from the set of problems by comparing said information with a set of criteria, said set of criteria being associated with said set of problems.

4. The home network analysis platform according to claim 1, wherein the processor is configured to retrieve solution information for said problem and communicate said solution information together with said problem to said user via said user interface.

5. The home network analysis platform according to claim 1, wherein said information includes noise information.

6. The home network analysis platform according to claim 1, wherein said processor is configured to iteratively receive information corresponding to the stability and the performance of the home network physical layer configuration from the one or more home network devices, and subsequently perform the analyzing, the associating and the communicating of the problem to the user.

7. The home network analysis platform according to claim 1, wherein a home network gateway is integrated with said home network analysis platform.

8. The home network analysis platform according to claim 1, wherein a remote server, connected to the home network via a network, is integrated with said home network analysis platform.

9. The home network analysis platform according to claim 1, wherein the at least one home network device is integrated with said home network analysis platform.

10. The home network analysis platform according to claim 1, wherein said user interface is at a remote server connected to the home network via a network.

11. The home network analysis platform according to claim 1, wherein said user interface is at a home network gateway of said home network.

12. The home network analysis platform according to claim 1, wherein said user interface is integrated with at least one home network device.

13. A method for monitoring a home network, the method comprising:
receiving information corresponding to a stability and a performance of a home network physical layer configuration of a home network from one or more home network devices, the home network physical layer configuration including twisted pair phone lines, electrical power wires or coaxial cables for in house data transmission, each of the one or more home network devices configured to be connected to the home network via a respective network technology;
analyzing said information to identify whether network connectivity problems associated with the home network physical layer configuration exists, the network connectivity problems including channel frequency response information, channel asymmetry information, channel non-linearity information and transceiver non-linearity information;
associating at least one identified network connectivity problem with a problem from a set of problems; and
communicating said problem to a user via a user interface to inform the user about said problem.

14. A non-transitory computer readable medium comprising computer-readable instructions which when executed by a processor, cause the processor to,
receive information corresponding to a stability and a performance of a home network physical layer configuration of a home network from one or more home network devices, the home network physical layer configuration including twisted pair phone lines, electrical power wires or coaxial cables for in house data transmission, each of the one or more home network devices configured to be connected to the home network via a respective network technology;
analyze said information to identify whether network connectivity problems associated with the home network physical layer configuration exists, the network connectivity problems including channel frequency response information, channel asymmetry information, channel non-linearity information and transceiver non-linearity information;
associate at least one identified network connectivity problem with a problem from a set of problems; and
communicate said problem to a user via a user interface to inform the user about said problem.

\* \* \* \* \*